US012634858B2

(12) United States Patent
Wang et al.

(10) Patent No.: US 12,634,858 B2
(45) Date of Patent: May 19, 2026

(54) DELAY COMPENSATION METHOD AND DEVICE

(71) Applicant: Ufi Space co., Ltd., New Taipei City (TW)

(72) Inventors: Yu-Min Wang, Taoyuan City (TW); Meng-Chiao Lin, Taipei City (TW)

(73) Assignee: Ufi Space co., Ltd., New Taipei City (TW)

( * ) Notice: Subject to any disclaimer, the term of this patent is extended or adjusted under 35 U.S.C. 154(b) by 108 days.

(21) Appl. No.: 18/347,564

(22) Filed: Jul. 6, 2023

(65) Prior Publication Data

US 2024/0430834 A1 Dec. 26, 2024

(30) Foreign Application Priority Data

Jun. 20, 2023 (TW) ................................. 112123240

(51) Int. Cl.
| | |
|---|---|
| *H04W 56/00* | (2009.01) |
| *H04W 76/20* | (2018.01) |
| *H04B 10/2575* | (2013.01) |
| *H04W 88/08* | (2009.01) |

(52) U.S. Cl.
CPC ....... *H04W 56/0045* (2013.01); *H04W 76/20* (2018.02); *H04B 10/25754* (2013.01); *H04W 88/085* (2013.01)

(58) Field of Classification Search
CPC . H04W 56/0045; H04W 76/20; H04W 72/23; H04W 56/0015; H04W 74/006; H04W 72/12; H04W 56/0065; H04W 56/0005; H04W 88/085; H04B 10/25754
See application file for complete search history.

(56) References Cited

U.S. PATENT DOCUMENTS

| | | | | |
|---|---|---|---|---|
| 5,416,779 A | * | 5/1995 | Barnes .............. | H04M 1/72505 |
| | | | | 370/280 |
| 5,450,409 A | * | 9/1995 | Diaz .................... | H04J 3/0682 |
| | | | | 370/470 |
| 8,165,100 B2 | * | 4/2012 | Sabat ............... | H04B 10/25754 |
| | | | | 370/337 |
| 9,705,770 B2 | * | 7/2017 | Cavaliere ............ | H04J 14/0275 |

(Continued)

FOREIGN PATENT DOCUMENTS

| | | |
|---|---|---|
| CN | 103155450 | 6/2013 |
| CN | 109716841 | 4/2021 |

(Continued)

OTHER PUBLICATIONS

ECPRI Specification V2.0 (May 10, 2019) (Year: 2019).*
"Office Action of Taiwan Counterpart Application", issued on Jun. 27, 2024, p. 1-p. 6.

*Primary Examiner* — Rebecca E Song
*Assistant Examiner* — Cason H Morse
(74) *Attorney, Agent, or Firm* — JCIPRNET

(57) ABSTRACT

A delay compensation method and device are provided. The method includes: obtaining a control plane message; obtaining a path delay of each of multiple radio units, and determining a compensation time length corresponding to each of the radio units based on a reference path delay and the path delay of each of the radio units; and sending the control plane message to each of the radio units based on the compensation time length corresponding to each of the radio units.

11 Claims, 6 Drawing Sheets

(56)     References Cited

U.S. PATENT DOCUMENTS

| | | | | |
|---|---|---|---|---|
| 9,948,419 | B2 * | 4/2018 | Ruffini | H04B 1/7073 |
| 2014/0078934 | A1 | 3/2014 | Hugl et al. | |
| 2014/0126588 | A1 | 5/2014 | Koebele et al. | |
| 2017/0026925 | A1 * | 1/2017 | Kim | H04W 56/0015 |
| 2017/0195981 | A1 * | 7/2017 | Shor | H04W 56/009 |
| 2018/0076914 | A1 * | 3/2018 | Zhou | H04J 14/0267 |
| 2018/0124729 | A1 * | 5/2018 | Hanson | H04J 3/0682 |
| 2018/0234875 | A1 * | 8/2018 | Leroudier | H04W 24/00 |
| 2022/0014236 | A1 | 1/2022 | Kosugi et al. | |
| 2022/0051956 | A1 * | 2/2022 | Elliott | H01L 21/4817 |
| 2023/0014537 | A1 | 1/2023 | Berg et al. | |
| 2023/0017897 | A1 * | 1/2023 | Jang | H03M 7/3062 |
| 2023/0037701 | A1 * | 2/2023 | Pinheiro | H04W 88/085 |
| 2023/0088205 | A1 | 3/2023 | Lourdu Raja et al. | |
| 2023/0115400 | A1 | 4/2023 | Jeon et al. | |
| 2023/0292273 | A1 * | 9/2023 | Zhang | H04W 56/0045 |
| 2023/0396347 | A1 * | 12/2023 | Abdelghaffar | H04B 17/364 |
| 2024/0283692 | A1 * | 8/2024 | Skov | H04L 27/2666 |

FOREIGN PATENT DOCUMENTS

| | | | | |
|---|---|---|---|---|
| EP | 3879714 | | 9/2021 | |
| EP | 4120664 | | 1/2023 | |
| EP | 4138472 | | 2/2023 | |
| KR | 20130082686 | * | 1/2015 | H04B 7/26 |
| KR | 20150009082 | | 1/2015 | |
| TW | M625140 | | 4/2022 | |

* cited by examiner

DELAY COMPENSATION METHOD AND DEVICE

CROSS-REFERENCE TO RELATED APPLICATION

This application claims the priority benefit of Taiwan application serial no. 112123240, filed on Jun. 20, 2023. The entirety of the above-mentioned patent application is hereby incorporated by reference herein and made a part of this specification.

BACKGROUND

Technical Field

The disclosure relates to a delay management mechanism, and in particular to a delay compensation method and device.

Description of Related Art

In the O-RAN.WG4.CUS.0-vXX.XX specification, the shared cell function supported by the fronthaul multiplexer (FHM) mode is defined. In this function, FHM may send and receive packets/messages called "O-RAN option split 7.2X", commonly known as evolved common public radio interface (eCPRI) messages. In general, the eCPRI messages may include control plane messages and user plane messages.

Please refer to FIG. 1A, which is a schematic diagram of a downlink operation of a conventional FHM. In FIG. 1A, a FHM 12 may be connected between a distributed unit (DU) 11 and N (where N is a positive integer) radio units (RU) 131 to 13N. The DU 11 is, for example, a DU under an open radio access network (O-RAN) architecture, and the RUs 131 to 13N are, for example, RUs under the O-RAN architecture, but not limited thereto.

During the process of the FHM 12 performing a downlink operation, the FHM 12 may copy an eCPRI message M0 into N copies of messages M1 to MN after receiving a message M0 (for example, an eCPRI message) from the DU 11, and respectively send the messages M1 to MN to the RUs 131 to 13N.

Please refer to FIG. 1B, which is a schematic diagram of an uplink operation of the FHM according to FIG. 1A. In FIG. 1B, the FHM 12 may receive corresponding messages M1' to MN' (such as eCPRI messages including user plane messages) from the RUs 131 to 13N, and obtain required radio frequency data from each of the messages M1' to MN'. After that, the FHM 12 may combine and compress the radio frequency data obtained from the messages M1' to MN' into a message M0' (for example, an eCPRI message), and upload the message M0' to the DU 11.

Please refer to FIG. 2A, which is a schematic diagram of a conventional DU performing downlink transmission on an RU. In FIG. 2A, the DU 11 may send (through the FHM 12) a control plane message CM to the RU (for example, each of the RUs 131 to 13N), and then send (through the FHM 12) each symbol of a user plane message UM corresponding to the control plane message CM to the RU. In this embodiment, the user plane message UM includes, for example, symbols UM1 to UMK (where K is a positive integer), but not limited thereto.

Please refer to FIG. 2B, which is a schematic diagram of a conventional RU performing uplink transmission on a DU. In FIG. 2B, the DU 11 may send the control plane message CM (through the FHM 12) to the RU (for example, each of the RUs 131 to 13N). Correspondingly, the RU may then send (through the FHM 12) each symbol of the user plane message UM corresponding to the control plane message CM to the DU 11. In this embodiment, the user plane message UM includes, for example, the symbols UM1 to UMK (where K is a positive integer), but not limited thereto.

In the prior art, when the FHM 12 executes the uplink operation, the message M0' can only be generated accordingly after waiting to receive the messages M1' to MN' corresponding to the same radio resource unit. However, since path lengths (for example, optical fiber lengths) between the FHM 12 and the RUs 131 to 13N are not equal, the messages M1' to MN' are received by the FHM 12 at different time points. In this case, the FHM 12 may need to be additionally provided with an element such as a buffer to temporarily store the messages received from one or more of the RUs 131 to 13N, thus increasing the cost of the FHM 12.

SUMMARY

The disclosure provides a delay compensation method and device, which can be used to solve the above technical issues.

An embodiment of the disclosure provides a delay compensation method, which is applicable to a delay compensation device and includes the following steps. A control plane message is obtained. A path delay of each of multiple radio units is obtained, and a compensation time length corresponding to each radio unit is determined based on a reference path delay and the path delay of each radio unit. The control plane message is sent to each radio unit based on the compensation time length corresponding to each radio unit.

An embodiment of the disclosure provides a delay compensation device, which includes a first processor and a delay compensation circuit. The first processor executes the following operations. A control plane message is obtained. A path delay of each of multiple radio units is obtained, and a compensation time length corresponding to each radio unit is determined based on a reference path delay and the path delay of each radio unit. The delay compensation circuit is coupled to the first processor and sends the control plane message to each radio unit based on the compensation time length corresponding to each radio unit.

DESCRIPTION OF THE EMBODIMENTS

Figure 1B:
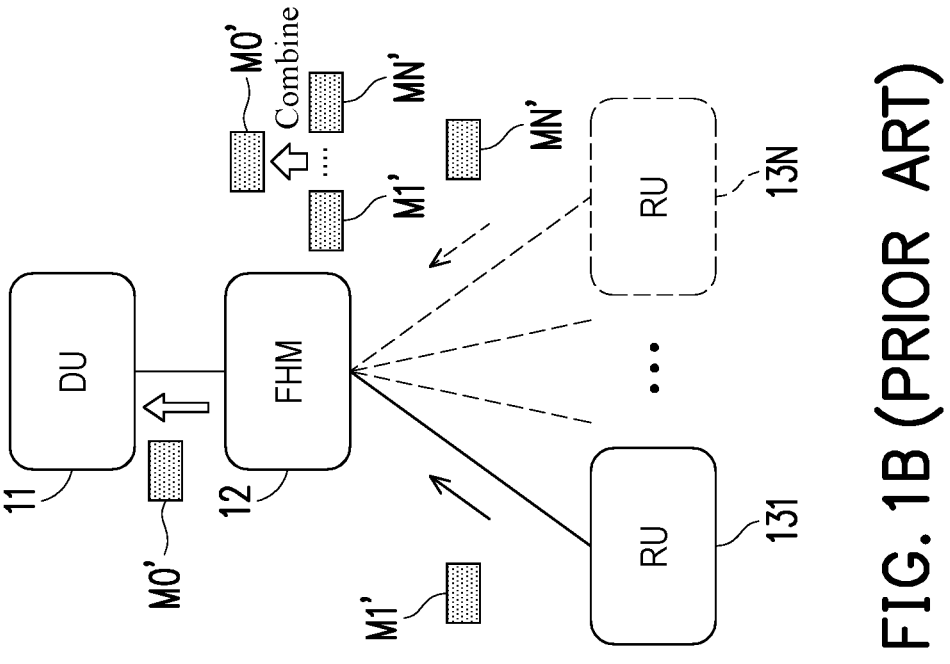
FIG. 1B is a schematic diagram of an uplink operation of the FHM according to FIG. 1A.
Figure 1A:
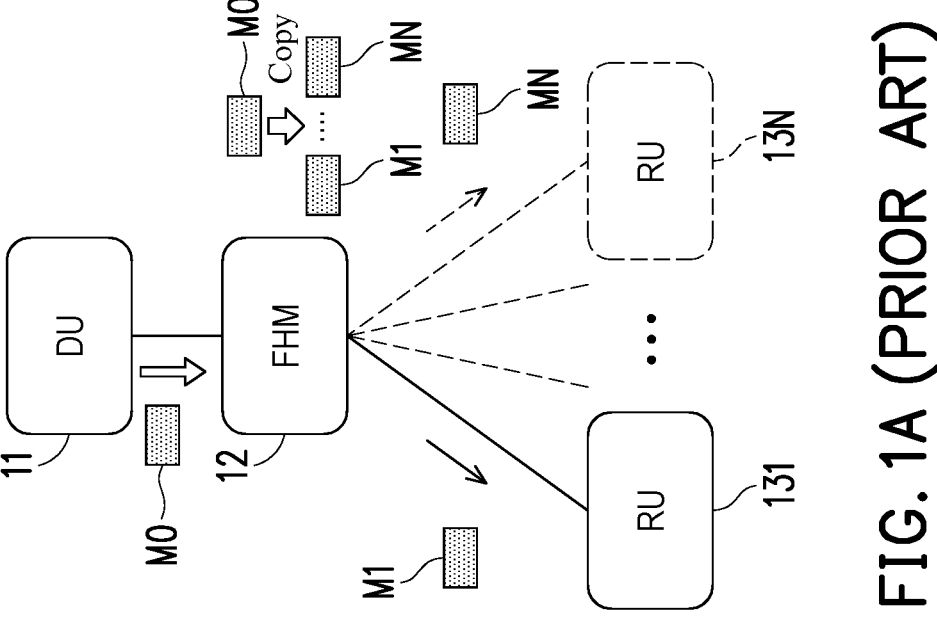
FIG. 1A is a schematic diagram of a downlink operation of a conventional FHM.
Figure 3:
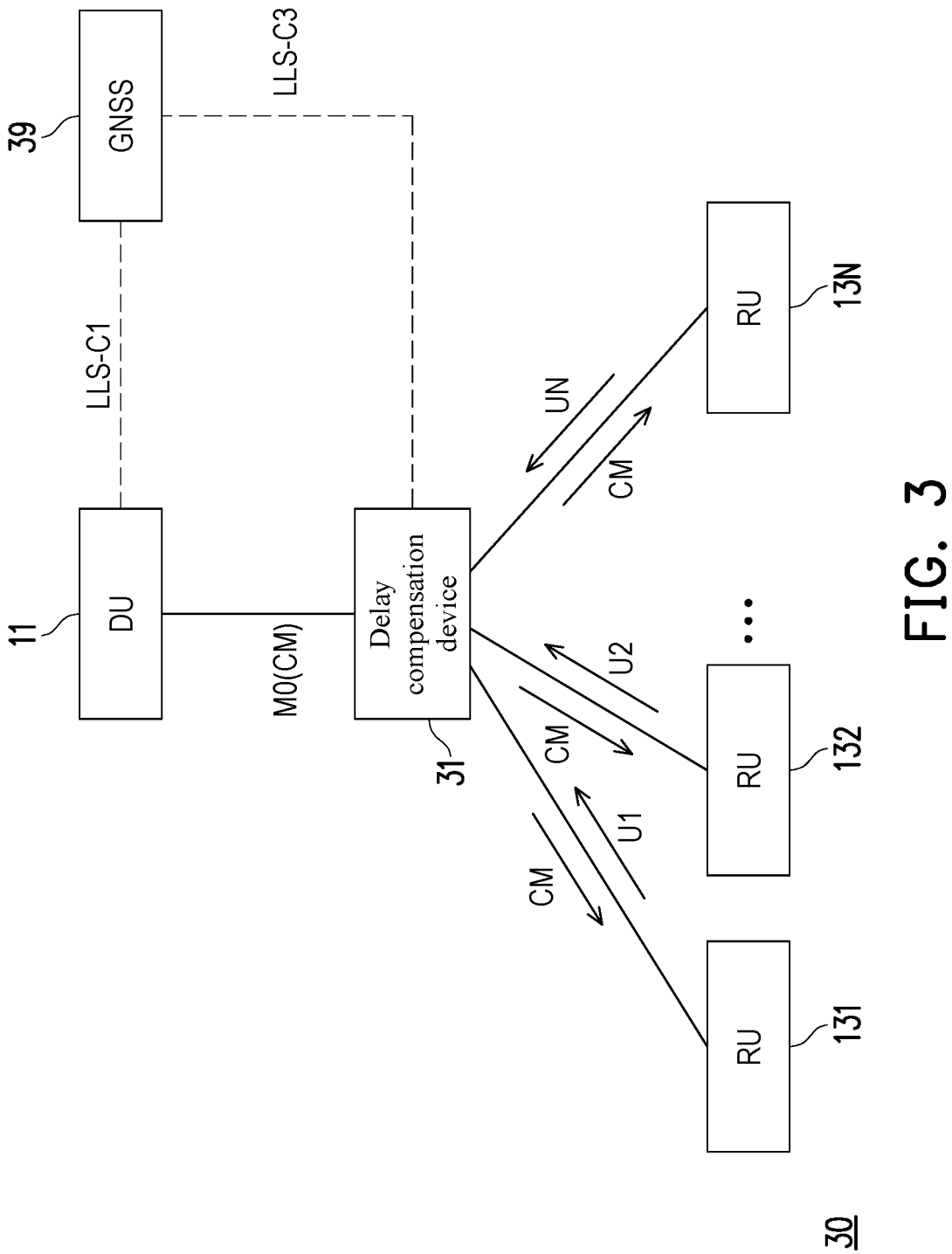
FIG. 3 is a schematic diagram of a system according to an embodiment of the disclosure.

Please refer to FIG. 3, which is a schematic diagram of a system according to an embodiment of the disclosure. In FIG. 3, a system 30 includes the DU 11, a delay compensation device 31, and the DUs 131 to 13N, wherein the delay compensation device 31 may be implemented as the FHM 12 in FIG. 1A and FIG. 1B, but not limited thereto.

Figure 4:
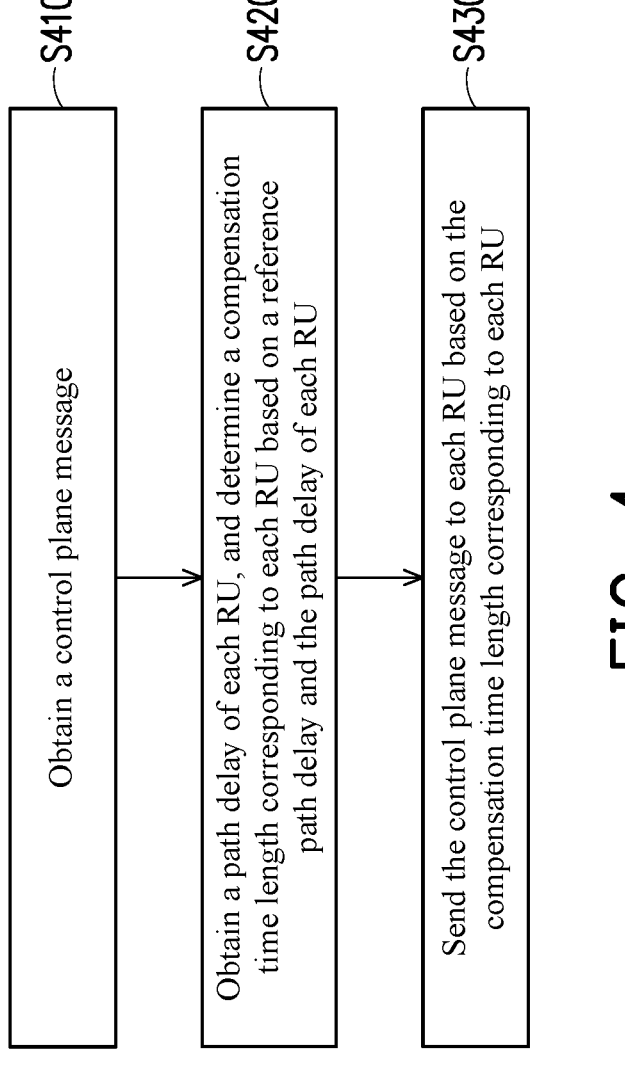
FIG. 4 is a flowchart of a delay compensation method according to an embodiment of the invention.

Please refer to FIG. 4, which is a flowchart of a delay compensation method according to an embodiment of the disclosure. The method of this embodiment may be executed by the delay compensation device 31 of FIG. 3, and the details of each step in FIG. 4 will be described below with the elements shown in FIG. 3.

First, in Step S410, the delay compensation device 31 obtains the control plane message CM. In an embodiment, the delay compensation device 31 may, for example, obtain the message M0 (for example, an eCPRI message) from the DU 11, and obtain the corresponding control plane message CM therefrom, but not limited thereto.

After that, in Step S420, the delay compensation device 31 obtains the path delay of each of the RUs 131 to 13N, and determines the compensation time length corresponding to each of the RUs 131 to 13N based on a reference path delay (hereinafter referred to as RD) and the path delay of each of the RUs 131 to 13N.

In an embodiment, the delay compensation device 31 may obtain a path length (for example, a fiber length) between each of the RUs 131 to 13N and the delay compensation device 31, and determine the path delay of each of the RUs 131 to 13N accordingly. For example, the fiber length of each kilometer generally corresponds to the path delay of 5.5 μs. Therefore, if the fiber length between the delay compensation device 31 and a certain RU is known, the delay compensation device 31 may directly multiply the known fiber length by 5.5 μs to obtain the path delay corresponding to the RU.

In addition, since several different lower layer splits (LLSs) such as LLS-C1, LLS-C2, LLS-C3, and LLS-C4 are defined in the O-RAN specification, the delay compensation device 31 may also determine the path delay corresponding to each RU based on the LLSs.

Taking FIG. 3 as an example, a global navigation satellite system (GNSS) 39 may, for example, provide precision time protocol (PTP) information to the DU 11 and/or the delay compensation device 31. In LLS-C1, the GNSS 39 may provide the PTP information to the DU 11, so that the DU 11 may be used as a master device when the delay compensation device 31 and each of the RUs 131 to 13N are synchronized. In addition, in LLS-C3, the GNSS 39 may provide the PTP information to the delay compensation device 31 (for example, the FHM), so that the delay compensation device 31 may be used as a master device when the DU 11 and each of the RUs 131 to 13N are synchronized. Based on this, the delay compensation device 31 may obtain the path delay corresponding to each of the RUs 131 to 13N during the synchronization process, but not limited thereto.

In an embodiment, the reference path delay RD is, for example, the maximum path delay among the path delays of the RUs 131 to 13N. For example, assuming that the path delay of the RU 131 among the RUs 131 to 13N is the maximum, the path delay of the RU 131 may be determined as the reference path delay RD. For another example, assuming that the path delay of the RU 13N among the RUs 131 to 13N is the maximum, the path delay of the RU 13N may be determined as the reference path delay RD, but not limited thereto. For the convenience of description, in the following embodiments, it is assumed that the path delay of the RU 132 is determined as the reference path delay RD, but only for example and not intended to limit the possible implementation manners of the disclosure.

In different embodiments, the delay compensation device 31 may determine the compensation time length corresponding to each of the RUs 131 to 13N using different manners.

Figure 2B:
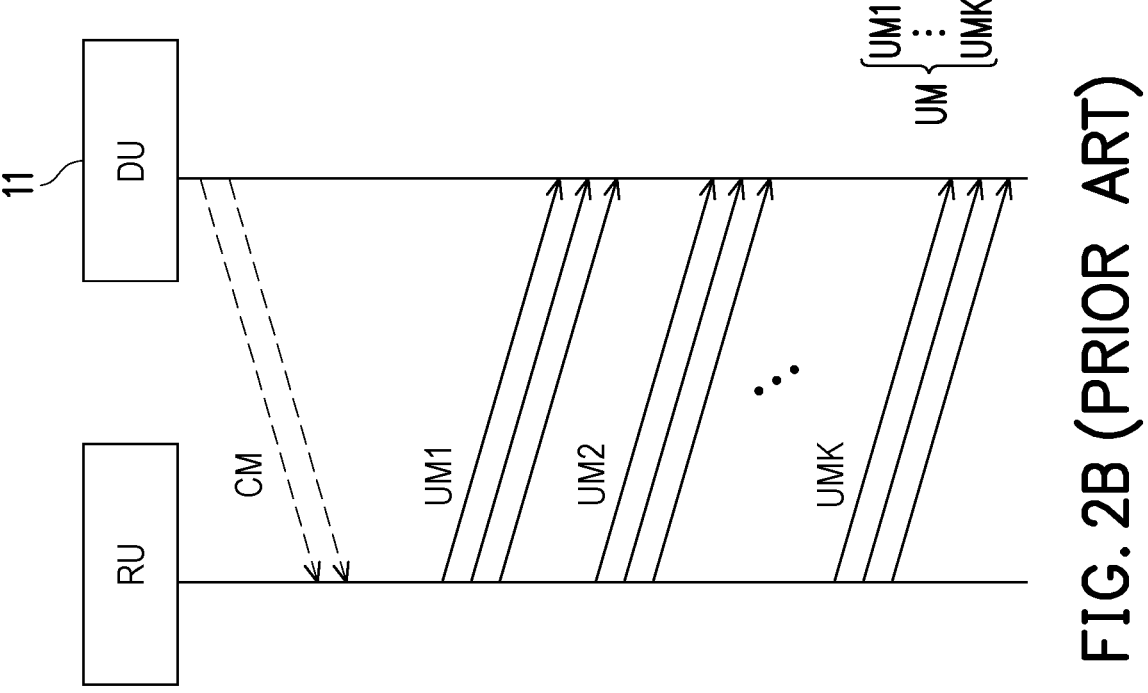
FIG. 2B is a schematic diagram of a conventional RU performing uplink transmission on a DU.

In a first embodiment (which may be understood as the embodiments of FIG. 1B and FIG. 2B) in which the delay compensation device 31 is used for an uplink operation, the control plane message CM may be used to trigger the RUs 131 to 13N to send corresponding user plane messages (for example, the messages M1' to MN' in FIG. 1B) to the delay compensation device 31. In this case, for the i-th RU (where $1 \le i \le N$) among the RUs 131 to 13N, the delay compensation device 31 may determine that the compensation time length corresponding to the i-th RU is "$CT\_i=(RD-d\_i)*2$", where $d\_i$ is the path delay corresponding to the i-th RU.

Figure 2A:
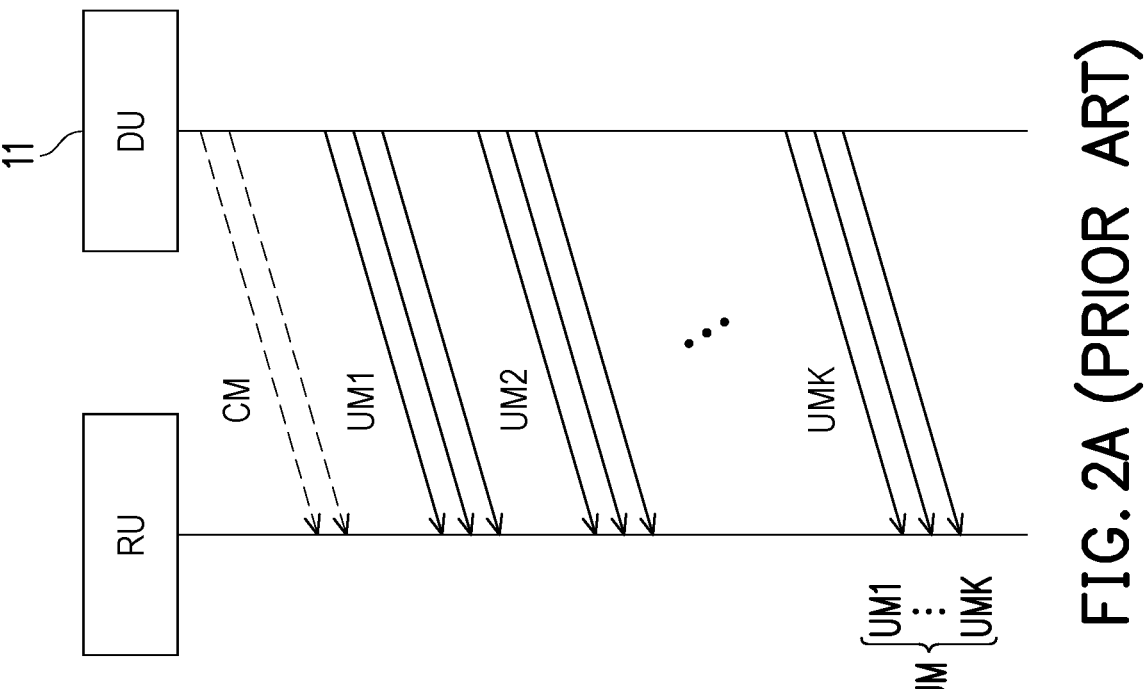
FIG. 2A is a schematic diagram of a conventional DU performing downlink transmission on an RU.

In addition, in a second embodiment (which may be understood as the embodiments of FIG. 1A and FIG. 2A) in which the delay compensation device 31 is used for a downlink operation, the control plane message CM may be used to instruct the delay compensation device 31 to send user plane messages (for example, the messages M1 to MN in FIG. 1A) to the RUs 131 to 13N. In this case, for the i-th RU (where $1 \le i \le N$) among the RUs 131 to 13N, the delay compensation device 31 may determine that the compensation time length corresponding to the i-th RU is "$CT\_i=(RD-d\_i)$", where $d\_i$ is the path delay corresponding to the i-th RU.

After that, in Step S430, the delay compensation device 31 sends the control plane message CM to each of the RUs 131 to 13N based on the compensation time length corresponding to each of the RUs 131 to 13N.

In an embodiment, the delay compensation device 31 may find a reference RU corresponding to the reference path delay RD among the RUs 131 to 13N, and determine a reference message sending time point (hereinafter referred to as T) of the reference RU. In the previous description, since the path delay of the RU 132 is assumed to correspond to the reference path delay RD, the RU 132 may be determined as the reference RU, and the delay compensation device 31 may correspondingly use a message sending time point of the RU 132 as the reference message sending time point T, but not limited thereto.

Afterwards, the delay compensation device 31 determines the message sending time point corresponding to each RU based on the reference message sending time point T and the compensation time length corresponding to each of the RUs 131 to 13N. In an embodiment, the message sending time point corresponding to the i-th RU may be, for example, expressed as "$TX\_i=T+CT\_i$". That is, the message sending time point corresponding to the i-th RU may be later than the reference message sending time point T by a corresponding compensation time length (that is, $CT\_i$).

Then, the delay compensation device 31 may send the control plane message CM to each of the RUs 131 to 13N at the corresponding message sending time point of each of the RUs 131 to 13N.

Thereby, the delay compensating device 31 may (almost) simultaneously receive user plane messages U1 to UN returned by the RUs 131 to 13N in response to the control plane message CM in the scenario of the first embodiment. In this case, the delay compensation device 31 does not need to be additionally provided with an element such as a buffer, thus saving the implementation cost of the delay compensation device 31.

Figure 5:
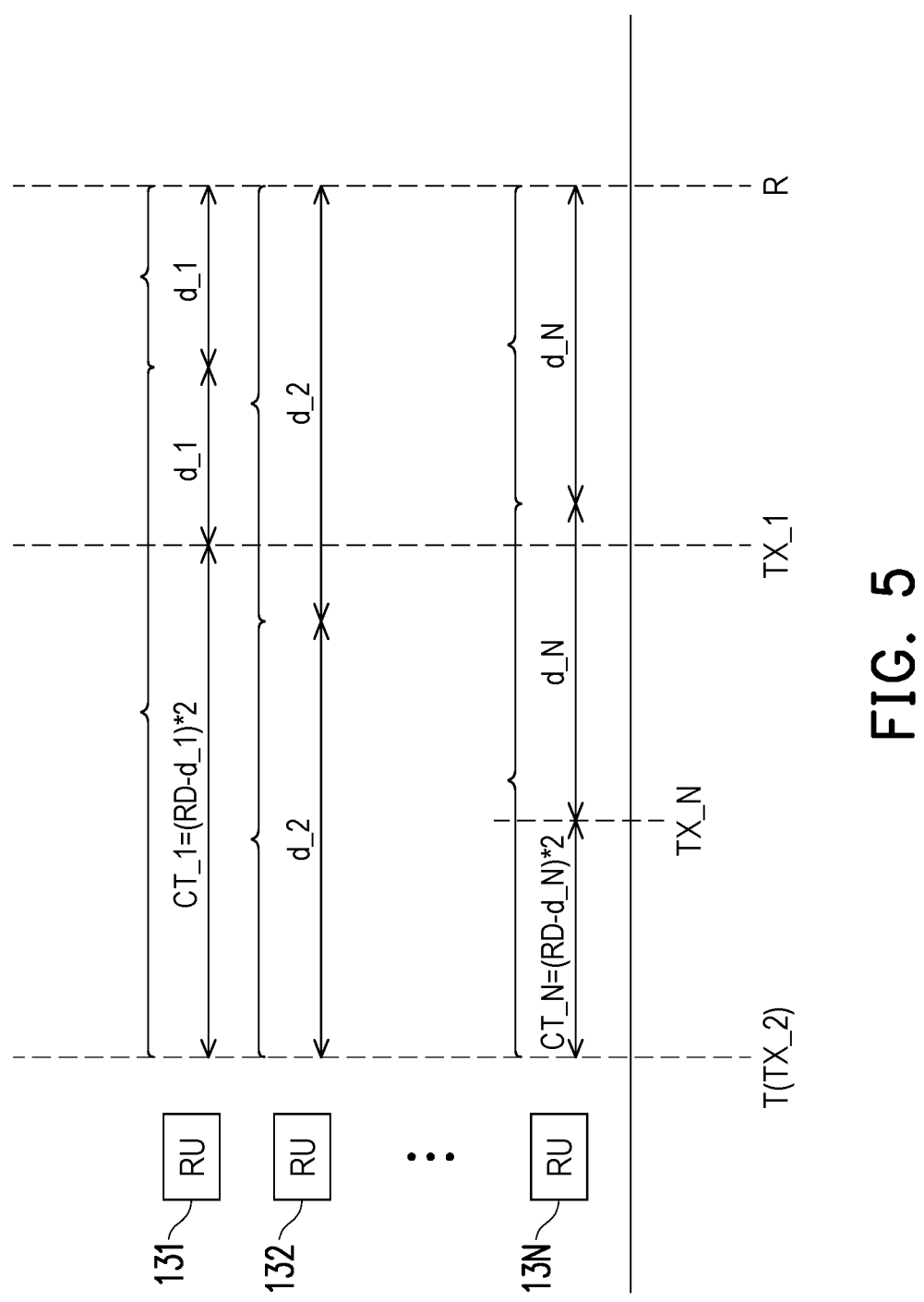
FIG. 5 is an application scenario diagram according to a first embodiment of the disclosure.

For ease of understanding, FIG. 5 is supplemented below for further description, wherein FIG. 5 is an application scenario diagram according to the first embodiment of the disclosure.

In FIG. 5, assuming that the RU 132 is the reference RU corresponding to the reference path delay RD (that is, a path delay d_2 of the RU 132 is equal to the reference path delay RD), the delay compensation device 31 may use the message sending time point of the RU 132 as the reference message sending time point T. In this case, the delay compensation device 31 may determine the message sending time point corresponding to each of the RUs 131 to 13N according to the previous teaching.

For example, a message sending time point TX_1 corresponding to the RU 131 (that is, the first RU) is, for example, "T+CT_1" (where CT_1=(RD−d_1)*2). In other words, the delay compensation device 31 sends the control plane message CM to the RU 131 at the message sending time point TX_1, and the control plane message CM reaches the RU 131 after experiencing the path delay d_1. Afterwards, the RU 131 may return the corresponding user plane message U1 in response to the control plane message CM, and the user plane message U1 reaches the delay compensation device 31 after experiencing the path delay d_1.

For example, a message sending time point TX_N corresponding to the RU 13N (that is, the N-th RU) is, for example, "T+CT_N" (where CT_N=(RD−d_N)*2). In other words, the delay compensation device 31 sends the control plane message CM to the RU 13N at the message sending time point TX_N, and the control plane message CM reaches the RU 13N after experiencing the path delay d_N. Afterwards, the RU 13N may return the corresponding user plane message UN in response to the control plane message CM, and the user plane message UN reaches the delay compensation device 31 after experiencing the path delay d_N.

In addition, a message sending time point TX_2 corresponding to the RU 132 (that is, the second RU) is, for example, "T+CT_2". However, since the RU 132 is assumed to be the reference RU, the corresponding compensation time length CT_2 is determined to be 0. In this case, the delay compensation device 31 sends the control plane message CM to the RU 132 at the reference message sending time point T (that is, the message sending time point TX_2), and the control plane message CM reaches the RU 132 after experiencing the path delay d_2. Afterwards, the RU 132 may return the corresponding user plane message U2 in response to the control plane message CM, and the user plane message U2 reaches the delay compensation device 31 after experiencing the path delay d_2.

Since the message sending time points TX_1 to TX_N corresponding to the RUs 131 to 13N are properly designed, the user plane messages U1 to UN corresponding to the RUs 131 to 13N may reach the delay compensation device 31 at almost the same time point R. In this case, the delay compensation device 31 does not need to be additionally provided with an element such as a buffer, thus saving the implementation cost of the delay compensation device 31.

In addition, after the delay compensation device 31 receives the user plane messages U1 to UN, a corresponding eCPRI message (for example, the message M0' of FIG. 1B) may then be generated accordingly, and the eCPRI message is sent to the DU 11.

In a third embodiment, the delay compensation device 31 may also generate the eCPRI message based only on the user plane messages U1 to UN corresponding to the RUs received within a preset time window. For example, the delay compensating device 31 may start timing after receiving any one of the user plane messages U1 to UN, and directly generate the corresponding eCPRI message based on the received user plane messages when it is determined that the accumulated time reaches the preset time window, but not limited thereto. From another point of view, the delay compensation device 31 may discard packets/messages received after exceeding the preset time window, so as to correspondingly generate the corresponding eCPRI message based on the received user plane messages, but not limited thereto.

In addition, for the scenario of the second embodiment, the method of the embodiment of the disclosure may also enable the control plane message CM and/or the user plane message UM to reach each of the RUs 131 to 13N at the same time, but not limited thereto.

Figure 6:
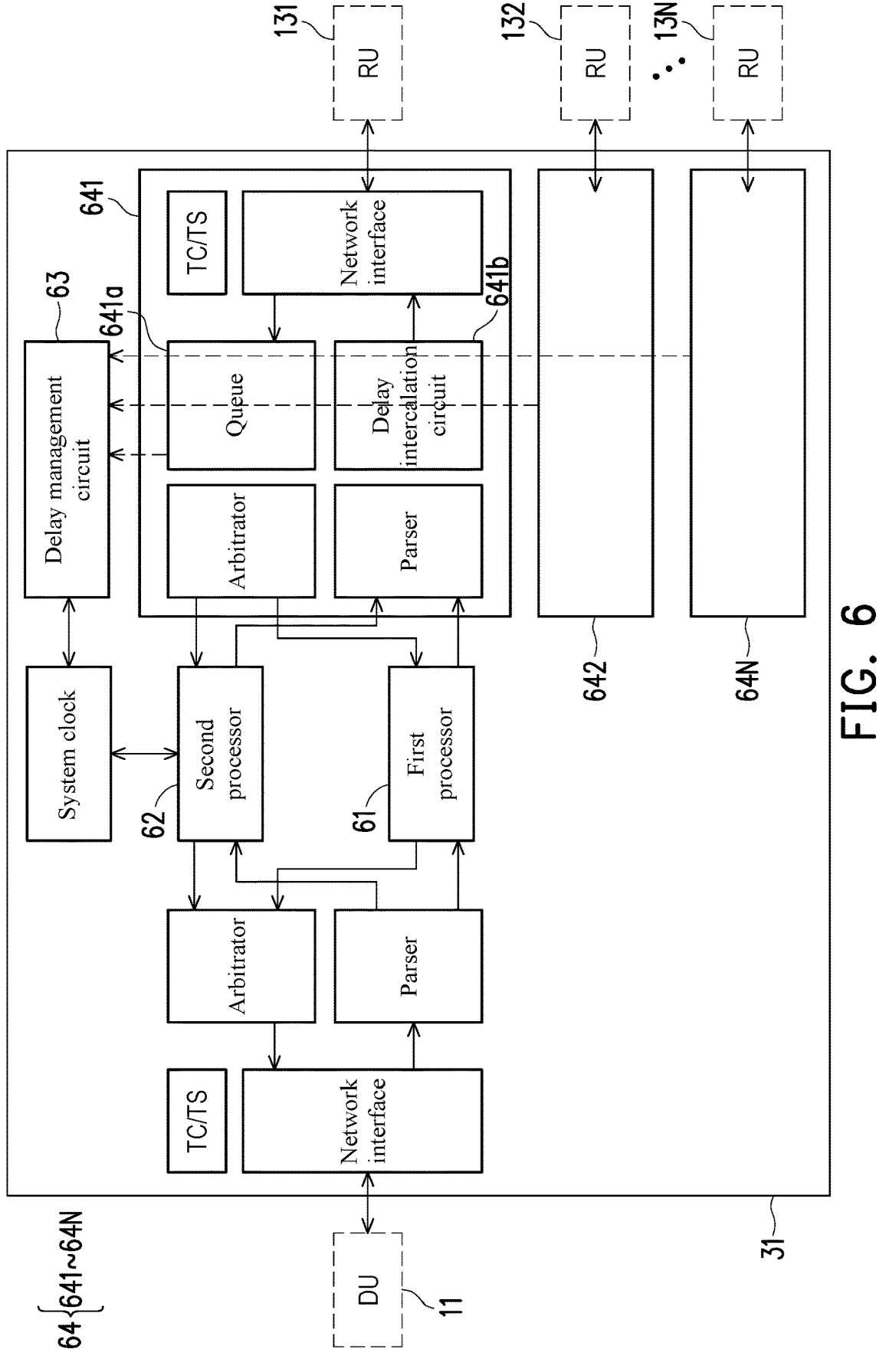
FIG. 6 is a functional block diagram of a delay compensation device according to an embodiment of the disclosure.

Please refer to FIG. 6, which is a functional block diagram of a delay compensation device according to an embodiment of the disclosure. In this embodiment, the delay compensation device 31 may be, for example, implemented as an FHM and may include circuits included in a general FHM, such as a transparent clock/timestamping (TC/TS) circuit, a network interface (for example, an Ethernet interface) for communicating with the DU 11, a parser (which may be used to parse/distinguish user plane messages, control plane messages, and/or synchronization plane messages from the DU 11), an arbitrator (which may be used to arbitrate the user plane messages, the control plane messages, and/or synchronization plane messages to the network interface), a system clock, a first processor 61 (for example, a PTP processor), and a second processor 62 (for example, an O-RAN processor). Reference may be made to relevant technical documents of the conventional FHM for the operation manners of the above circuits, which will not be repeated here.

It should be noted that compared with the conventional FHM, the delay compensation device 31 of FIG. 6 further includes a delay management circuit 63 and a delay compensation circuit 64.

In an embodiment of the disclosure, the first processor 61 may be used to execute Steps S410 and S420 of FIG. 4, and the delay compensation circuit 64 may be used to execute Step S430 of FIG. 4.

In an embodiment, the second processor 62 and the delay management circuit 63 may be used to cooperate to implement the operations mentioned in the third embodiment. For example, the delay management circuit 63 may start timing after determining that any one of the user plane messages U1 to UN is received, and notify the second processor 62 to directly generate the corresponding eCPRI message based on the received user plane messages when it is determined that the accumulated time reaches the preset time window. That is, the delay management circuit 63 may be used to discard the packets/messages received after exceeding the preset time window, but not limited thereto.

In FIG. 6, the delay compensation circuit 64 may include communication circuits 641 to 64N respectively corresponding to the RUs 131 to 13N, wherein the communication circuits 641 to 64N have the same/similar structures and operation manners, so the following will only be described based on the communication circuit 641, and persons skilled in the art should be able to correspondingly understand the operation manners of the communication circuits 642 to 64N.

In this embodiment, the communication circuit 641 may include an arbiter, a parser, a queue 641a, a delay intercalation circuit 641b, a TC/TS circuit, and a network interface for communicating with the RU 131, wherein reference may be made to the content of the previous embodiment for the functions/descriptions of the arbiter, the parser, the TC/TS circuit, and the network interface in the communication circuit 641, which will not be repeated here.

In FIG. 6, the delay intercalation circuit 641*b* may be used to add the compensation time length CT_1 corresponding to the RU 131 to the reference message sending time point T to determine the message sending time point TX_1 corresponding to the RU 131. In this way, the communication circuit 641 may send the control plane message CM to the RU 131 at the message sending time point TX_1.

In addition, the queue 641*a* may be coupled to the delay management circuit 63 and may be used to store the user plane message U1 from the RU 131.

In an embodiment, the delay management circuit 63 may be coupled to queues in the communication circuits 641 to 64N to monitor the time points when the user plane messages U1 to UM reach the delay compensation device 31, but not limited thereto.

In summary, the technical solutions proposed by the embodiments of the disclosure may determine the compensation time length corresponding to each RU based on the path delay of each RU, and add the corresponding compensation time length to the reference message sending time point accordingly as the message sending time point for sending the control plane message to each RU. In this way, the user plane messages returned by the RUs in response to the control plane message may reach the delay compensation device (for example, the FHM) at almost the same time point. In this case, the delay compensation device according to the embodiments of the disclosure does not need to additionally design an element such as a buffer, thus reducing the implementation cost of the delay compensation device.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A delay compensation method, applicable to a delay compensation device, comprising:
obtaining a control plane message;
obtaining a path delay of each of a plurality of radio units, and determining a plurality of different compensation time lengths, each of the compensation time lengths corresponding to each of the radio units based on a reference path delay and the path delay of each of the radio units;
finding a reference radio unit corresponding to the reference path delay among the radio units, and determining a reference message sending time point of the reference radio unit,
determining a plurality of different message sending time points corresponding to each of the radio units based on the reference message sending time point and the plurality of different compensation time lengths corresponding to each of the radio units;
sending the control plane message to each of the radio units at each of the plurality of different message sending time points corresponding to each of the radio units; and
receiving a user plane message corresponding to the control plane message sent from each of the radio units, wherein the corresponding user plane message is directly processed after being received by the delay compensation device without being delayed in the delay compensation device,

wherein the control plane message triggers each of the radio units to send the corresponding user plane message to the delay compensation device, and the step of determining the compensation time length corresponding to each of the radio units based on the reference path delay and the path delay of each of the radio units comprises:
for an i-th radio unit among the radio units, determining that the compensation time length corresponding to the i-th radio unit for round-trip delay is:

$$CT\_i = (RD - d\_i)*2,$$

where RD is the reference path delay, and d_i is the path delay corresponding to the i-th radio unit.

2. The delay compensation method according to claim 1, wherein the step of obtaining the control plane message comprises:
obtaining a first evolved common public radio interface message from a distributed unit, wherein the first evolved common public radio interface message comprises the control plane message.

3. The delay compensation method according to claim 1, wherein the reference path delay is a maximum path delay among the path delays of the radio units.

4. The delay compensation method according to claim 1, wherein the message sending time point corresponding to the i-th radio unit among the radio units is represented as:

$$TX\_i = T + CT\_i,$$

where T is the reference message sending time point, and CT_i is the compensation time length corresponding to the i-th radio unit.

5. The delay compensation method according to claim 1, wherein the step of obtaining the path delay of each of the radio units comprises:
obtaining a path length between each of the radio units and the delay compensation device, and determining the path delay of each of the radio units accordingly.

6. The delay compensation method according to claim 1, wherein after the step of sending the control plane message to each of the radio units based on the compensation time length corresponding to each of the radio units and receiving the corresponding user plane message from each of the radio units, the delay compensation method further comprises:
generating a second evolved common public radio interface message accordingly; and
sending the second evolved common public radio interface message to a distributed unit.

7. The delay compensation method according to claim 6, further comprising:
generating the second evolved common public radio interface message only based on the user plane message corresponding to each of the radio units received within a preset time window.

8. A delay compensation device, comprising:
a first processor, executing:
obtaining a control plane message;
obtaining a path delay of each of a plurality of radio units, and determining a plurality of different compensation time lengths, each of the compensation time lengths corresponding to each of the radio units based on a reference path delay and the path delay of each of the radio units; a delay compensation circuit, coupled to the first processor, executing:

finding a reference radio unit corresponding to the reference path delay among the radio units, and determining a reference message sending time point of the reference radio unit, determining a plurality of different message sending time points corresponding to each of the radio units based on the reference message sending time point and the plurality of different compensation time lengths corresponding to each of the radio units;

sending the control plane message to each of the radio units at each of the plurality of different message sending time points corresponding to each of the radio units; and receiving a user plane message corresponding to the control plane message sent from each of the radio units; and a delay management circuit, coupled to a second processor, directly executing a processing for the corresponding user plane message after being received by the delay compensation device without being delayed in the delay compensation device, wherein the control plane message triggers each of the radio units to send the corresponding user plane message to the delay compensation device, and the first processor further executes:

for an i-th radio unit among the radio units, determining that the compensation time length corresponding to the i-th radio unit for round-trip delay is:

$$CT\_i = (RD - d\_i) * 2,$$

where RD is the reference path delay, and d_i is the path delay corresponding to the i-th radio unit.

9. The delay compensation device according to claim 8, wherein the delay compensation device is a fronthaul multiplexer.

10. The delay compensation device according to claim 8, wherein the delay compensation device further comprises the second processor coupled to the delay compensation circuit, wherein the second processor generates a second evolved common public radio interface message according to the user plane message corresponding to each of the radio units, and sends the second evolved common public radio interface message to a distributed unit.

11. The delay compensation device according to claim 10, wherein the delay compensation circuit comprises a queue, the queue stores the user plane message received from each of the radio units, and the second processor further executes:

generating the second evolved common public radio interface message only based on the user plane message corresponding to each of the radio units received within a preset time window in response to a notification of the delay management circuit.

* * * * *